(12) United States Patent
Han

(10) Patent No.: US 11,254,228 B2
(45) Date of Patent: Feb. 22, 2022

(54) COVER MODULE OF CHARGING PORT FOR ELECTRIC VEHICLE

(71) Applicants: Hyundai Motor Company, Seoul (KR); Kia Motors Corporation, Seoul (KR)

(72) Inventor: Se Young Han, Yongin-si (KR)

(73) Assignees: Hyundai Motor Company, Seoul (KR); Kia Motors Cornoration, Seoul (KR)

( * ) Notice: Subject to any disclaimer, the term of this patent is extended or adjusted under 35 U.S.C. 154(b) by 17 days.

(21) Appl. No.: 17/034,699

(22) Filed: Sep. 28, 2020

(65) Prior Publication Data

US 2021/0380004 A1 Dec. 9, 2021

(30) Foreign Application Priority Data

Jun. 8, 2020 (KR) .......................... 10-2020-0069187

(51) Int. Cl.
*B60L 53/16* (2019.01)
*B62D 27/02* (2006.01)

(52) U.S. Cl.
CPC ............ *B60L 53/16* (2019.02); *B62D 27/023* (2013.01); *B62D 27/026* (2013.01)

(58) Field of Classification Search
CPC ...... B60L 53/16; B62D 27/023; B62D 27/026

USPC ......................................................... 296/191
See application file for complete search history.

(56) References Cited

U.S. PATENT DOCUMENTS

| 6,769,727 | B2 * | 8/2004 | Delavalle | B62D 25/163 |
| | | | | 293/120 |
| 2004/0007407 | A1 * | 1/2004 | Bivens | B62D 29/008 |
| | | | | 180/68.2 |
| 2015/0003899 | A1 * | 1/2015 | Lankenau | B29C 65/606 |
| | | | | 403/270 |
| 2020/0369326 | A1 * | 11/2020 | Honko | B62D 25/025 |

FOREIGN PATENT DOCUMENTS

KR 20200006283 A 1/2020

* cited by examiner

*Primary Examiner* — Pinel E Romain
(74) *Attorney, Agent, or Firm* — Slater Matsil, LLP

(57) ABSTRACT

A cover module of a charging port for an electric vehicle includes a panel coupling body comprising a charging housing fixed to an inner panel of a vehicle body of the electric vehicle to form a mounting hole, and a side outer coupled to face the inner panel fixed to the charging housing so that the mounting hole formed by the charging housing and the inner panel is maintained, and a cover main body formed in a shape corresponding to the mounting hole, provided with a plurality of hooks along an edge thereof to cover the mounting hole, and coupled to the panel coupling body by the hooks.

17 Claims, 7 Drawing Sheets

[FIG. 1]
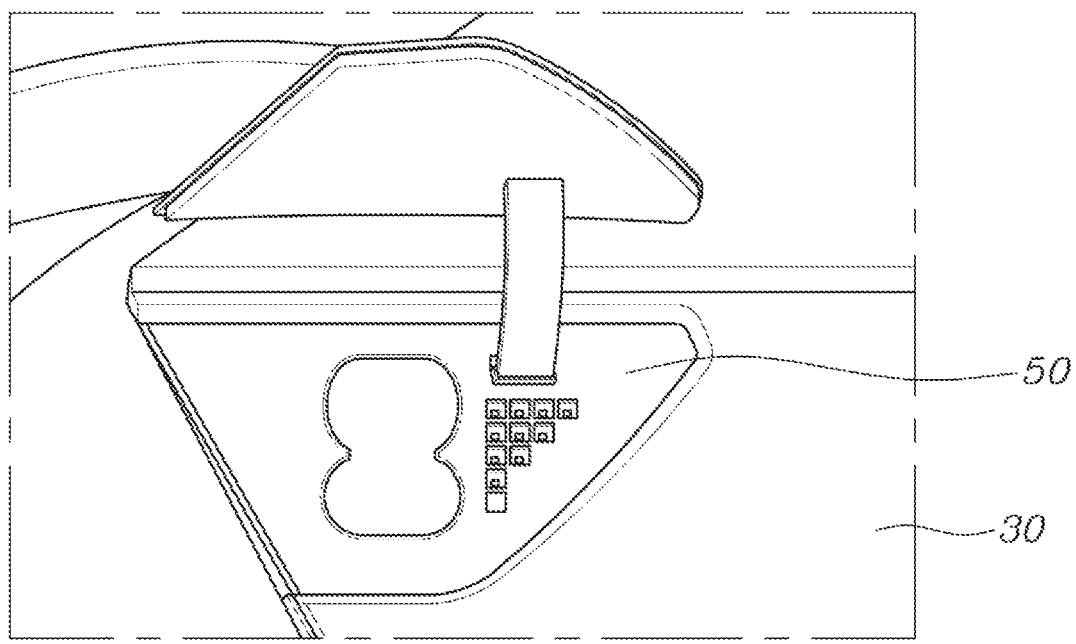

[FIG. 2]
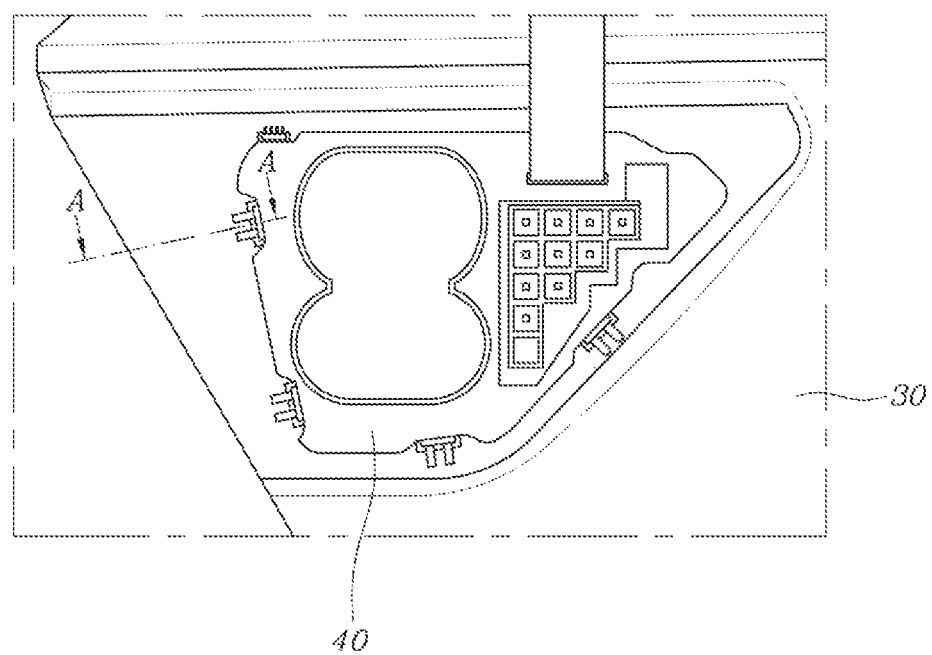

[FIG. 3A]
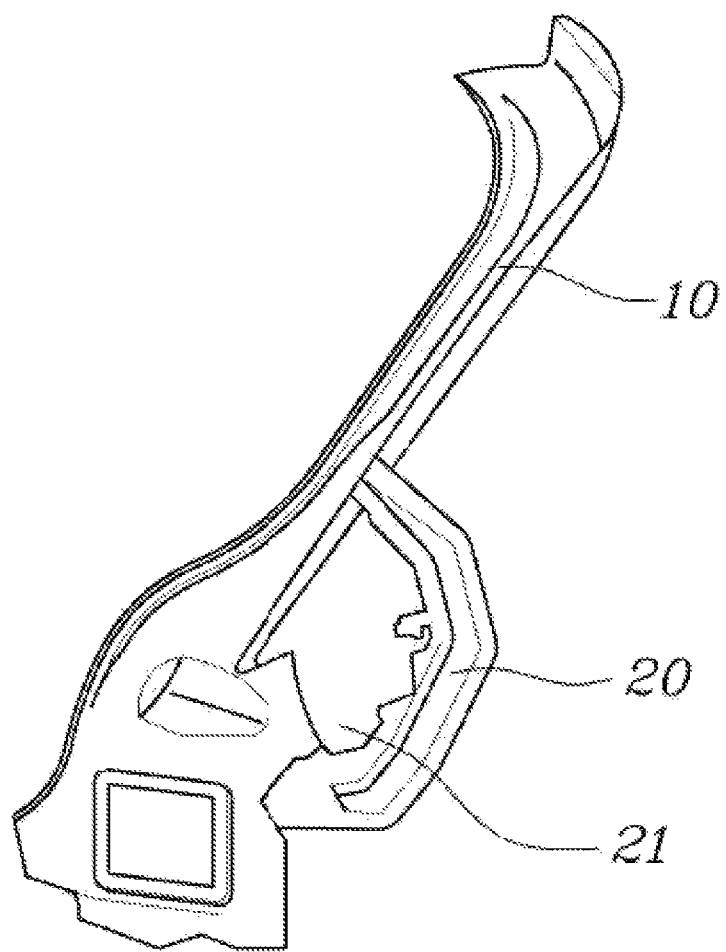

[FIG. 3B]
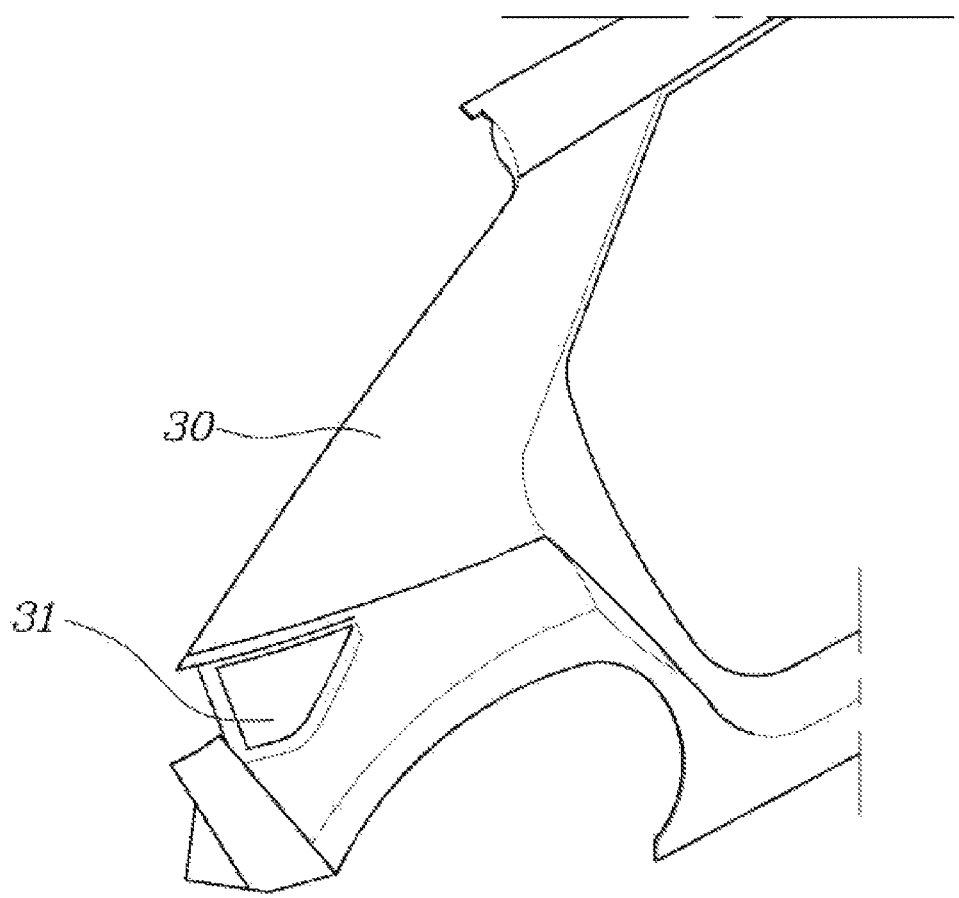

[FIG. 3C]
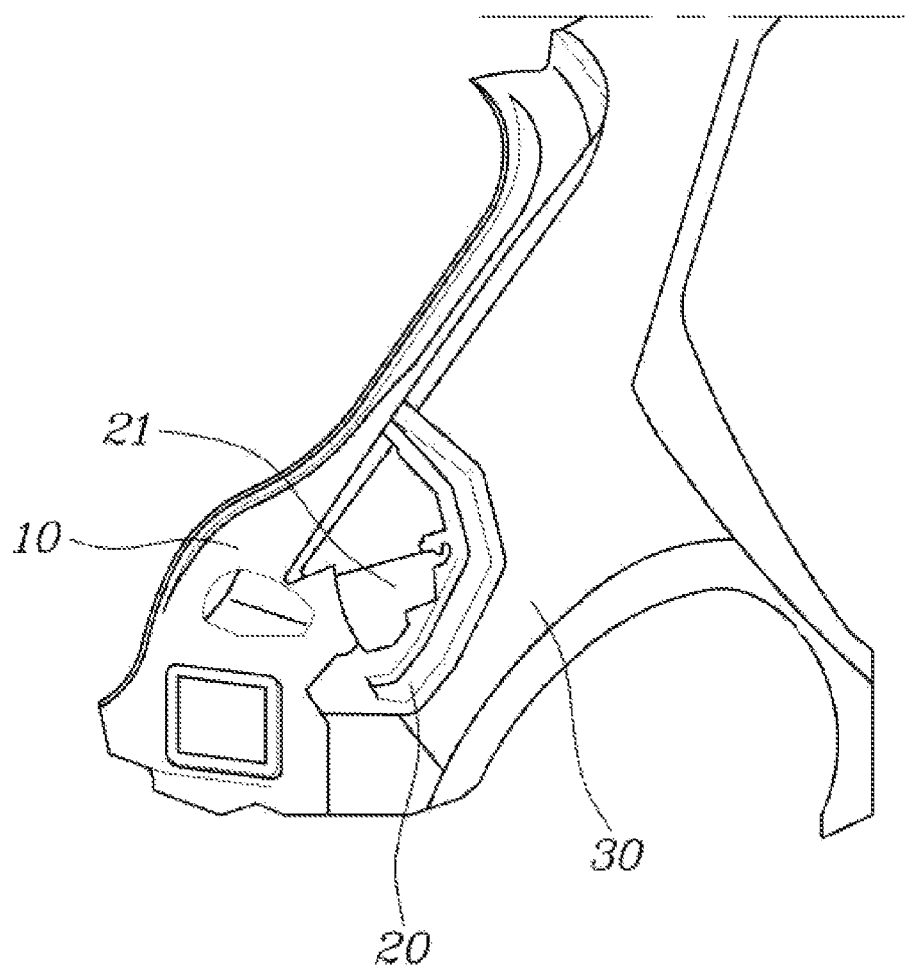

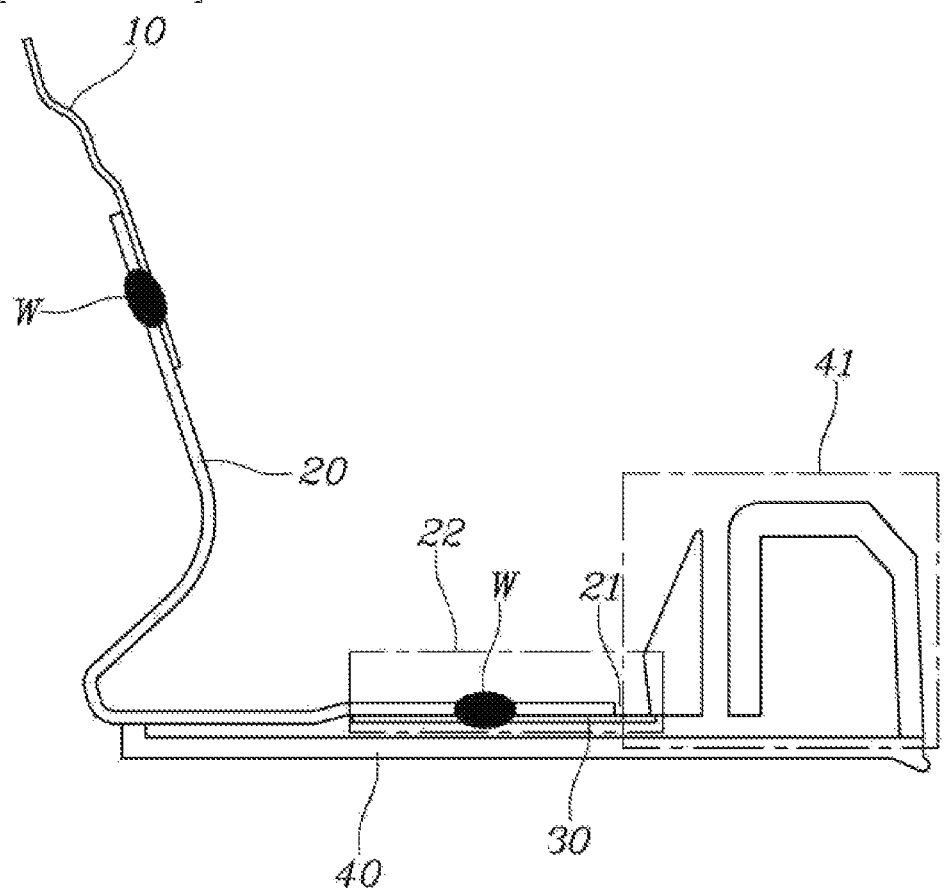

[FIG. 5]
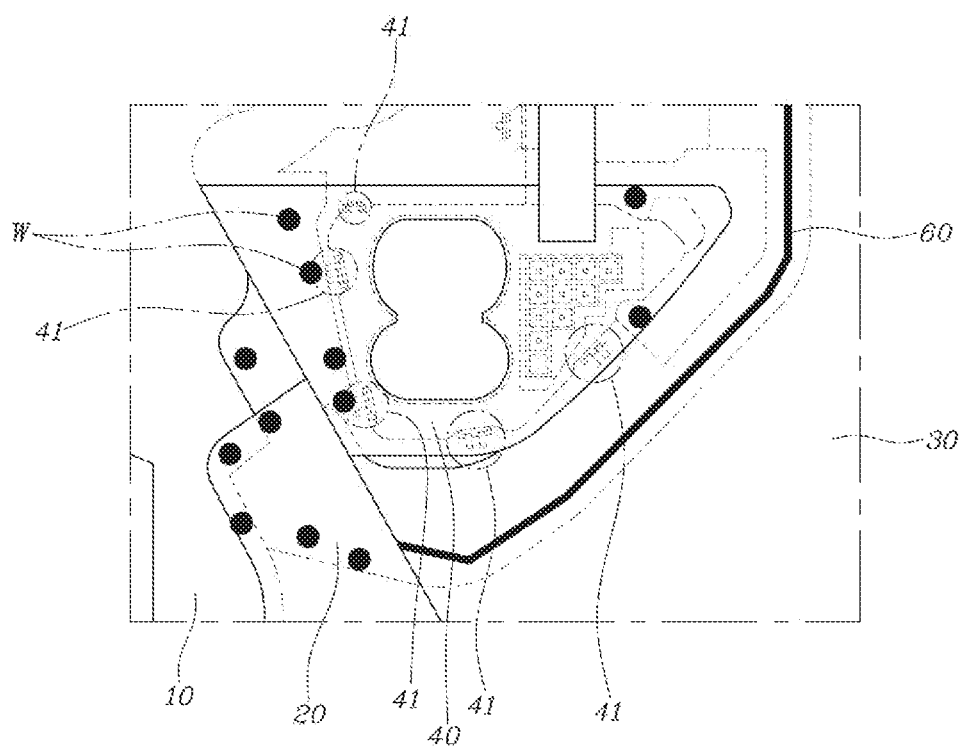

COVER MODULE OF CHARGING PORT FOR ELECTRIC VEHICLE

CROSS-REFERENCE TO RELATED APPLICATIONS

This application claims priority to Korean Patent Application No. 10-2020-0069187, filed on Jun. 8, 2020, which application is hereby incorporated herein by reference.

TECHNICAL FIELD

The present disclosure relates to a cover module of a charging port for an electric vehicle.

BACKGROUND

Generally, an electric vehicle is a vehicle mounted with a battery and a motor and is powered by electric power, and provided with a charging port for charging a battery.

The charging port is coupled to a charging housing and coupled to an inner panel of the vehicle.

At this time, the charging housing and the inner panel are coupled by a separate mechanical fastening means such as a separate bolt.

This coupling method by the fastening of the bolt may be applied to the electric vehicle having no design limitation, but a recent electric vehicle has pursued luxury and beauty, and the coupling method by the fastening of the bolt has a limitation in achieving the desired level of luxury and beauty.

Accordingly, in configuring the charging port in the vehicle body, research has been conducted on a structure excluding the coupling method by the fastening of the bolt.

The foregoing explained as the background is intended merely to aid in the understanding of the background of the present disclosure, and is not intended to mean that the present disclosure falls within the purview of the related art that is already known to those skilled in the art.

The present disclosure relates to a cover module of a charging port for an electric vehicle. Particular embodiments relate to a cover module of a charging port for an electric vehicle capable of implementing simplicity and beauty in a hook fastening method without a separate fastening means.

Embodiments of the present disclosure provide a cover module of a charging port for an electric vehicle capable of implementing simplicity and beauty by coupling a cover main body to a panel configuring a vehicle body in a hook fastening method without a separate fastening means such as a bolt.

A cover module of a charging port for an electric vehicle according to an exemplary embodiment of the present disclosure includes a panel coupling body including a charging housing fixed to an inner panel configuring a vehicle body of an electric vehicle to form a mounting hole, and a side outer coupled to face the inner panel fixed to the charging housing so that the mounting hole formed by the charging housing and the inner panel is maintained, and a cover main body formed in a shape corresponding to the mounting hole, provided with a plurality of hooks along the edge thereof to cover the mounting hole, and coupled to the panel coupling body by the hook.

The peripheral of the mounting hole of the panel coupling body is formed with a reinforcement portion in which the charging housing and the side outer overlap with each other.

The cover main body is fixed to the panel coupling body while the plurality of hooks are in close contact with the reinforcement portion.

The hook provides an elastic force outward from the center of the mounting hole formed in the panel coupling body.

The reinforcement portion is formed with a welding point at which the charging housing and the side outer are spot-welded.

The cover module of the charging port further includes a skin covering the surface of the cover main body.

The skin is bonded to the panel coupling body by an adhesive.

The inner panel is any one of a quarter inner panel, a filler inner panel, and an extension extending therefrom configuring the vehicle body of the electric vehicle.

According to an exemplary embodiment of the present disclosure, it is possible to couple the cover main body covering the charging port to the panel configuring the vehicle body by the hook method, thereby securing the beauty of the appearance.

In addition, it is possible to form the reinforcement portion in which the charging housing and the side outer overlap with each other at the portion at which the hook of the cover main body is fastened, thereby securing the rigidity of the vehicle body upon coupling the cover main body, and coupling the parts with each other without the stepped portion.

In addition, it is possible to couple the skin to the housing coupled to the inner panel using the adhesive, thereby securing the rigidity of the skin at the portion around the charging port.

The effects obtainable in embodiments of the present disclosure are not limited to the aforementioned effects, and other effects not mentioned may be clearly understood by those skilled in the art to which the present disclosure pertains from the following description.

BRIEF DESCRIPTION OF THE DRAWINGS

The above and other objects, features and other advantages of embodiments of the present disclosure will be more clearly understood from the following detailed description when taken in conjunction with the accompanying drawings, in which:

FIG. 1 is a perspective diagram illustrating a cover module of a charging port for an electric vehicle according to an exemplary embodiment of the present disclosure;

FIG. 2 is a perspective diagram illustrating main portions of the cover module of the charging port for the electric vehicle according to an exemplary embodiment of the present disclosure;

FIG. 3A is a perspective diagram illustrating a fixed state between an inner panel and a charging housing of the cover module of the charging port for the electric vehicle according to an exemplary embodiment of the present disclosure;

FIG. 3B is a perspective diagram illustrating a side outer of the cover module of the charging port for the electric vehicle according to an exemplary embodiment of the present disclosure;

FIG. 3C is a perspective diagram illustrating a panel coupling body of the cover module of the charging port for the electric vehicle according to an exemplary embodiment of the present disclosure;

FIG. 4 is a cross-sectional diagram illustrating a cross section taken along the line A-A illustrated in FIG. 2; and FIG. 5 is a diagram illustrating the main portions of the cover module of the charging port for the electric vehicle according to an exemplary embodiment of the present disclosure.

DETAILED DESCRIPTION OF ILLUSTRATIVE EMBODIMENTS

Hereinafter, exemplary embodiments of the present disclosure will be described in more detail with reference to the accompanying drawings. However, the present disclosure is not limited to the exemplary embodiments disclosed below but will be implemented in various different forms, and the present exemplary embodiments only allow the disclosure of the present disclosure to be complete, and are provided to completely inform those skilled in the art of the scope of the disclosure. The same reference numerals in the drawings refer to the same elements.

FIG. 1 is a perspective diagram illustrating a cover module of a charging port for an electric vehicle according to an exemplary embodiment of the present disclosure, FIG. 2 is a perspective diagram illustrating main portions of the cover module of the charging port for the electric vehicle according to an exemplary embodiment of the present disclosure, FIG. 3A is a perspective diagram illustrating a fixed state between an inner panel and a charging housing of the cover module of the charging port for the electric vehicle according to an exemplary embodiment of the present disclosure, FIG. 3B is a perspective diagram illustrating a side outer of the cover module of the charging port for the electric vehicle according to an exemplary embodiment of the present disclosure, FIG. 3C is a perspective diagram illustrating a panel coupling body of the cover module of the charging port for the electric vehicle according to an exemplary embodiment of the present disclosure, FIG. 4 is a cross-sectional diagram illustrating a cross section taken along the line A-A illustrated in FIG. 2, and FIG. 5 is a diagram illustrating the main portions of the cover module of the charging port for the electric vehicle according to an exemplary embodiment of the present disclosure.

As illustrated in the drawings, the cover module of the charging port for the electric vehicle according to an exemplary embodiment of the present disclosure includes panel coupling bodies 10, 20, 30 having a mounting hole 21 formed therein, and a cover main body 40 coupled to the panel coupling bodies 10, 20, 30 in a hook fastening method.

The panel coupling bodies 10, 20, 30 are means for providing a portion to which the cover main body 40 is coupled, including a charging housing 20 fixed to the inner panel 10 configuring a vehicle body of an electric vehicle to form the mounting hole 21, and a side outer 30 coupled to face the inner panel 10 fixed to the charging housing 20 so that the mounting hole 21 formed by the charging housing 20 and the inner panel 10 is maintained.

At this time, the inner panel 10 is preferably applied selectively according to a location of the charging port formed for charging an electric vehicle. For example, the inner panel 10 is preferably any one of a quarter inner panel, a filler inner panel, and an extension extending therefrom configuring the vehicle body of the electric vehicle. In the present exemplary embodiment, the extension will be described as an example of the inner panel.

Meanwhile, the inner panel 10 and the charging housing 20 are fixed to each other by spot welding to form the mounting hole 21, as illustrated in FIG. 3A.

In addition, as illustrated in FIG. 3B, the side outer 30 is also formed with a through hole 31 in a region corresponding to the mounting hole 21 so that the mounting hole 21 is maintained in the case of bonding the inner panel 10 and the charging housing 20 to the side outer 30 as illustrated in FIG. 3C.

Accordingly, the mounting hole 21 is maintained in the panel coupling bodies 10, 20, 30 composed of the inner panel 10, the charging housing 20, and the side outer 30.

Of course, at this time, the mounting holes 21 and the through hole 31 may have the same shapes, but are not limited thereto and the inner circumferential surfaces of the mounting hole 21 and the through hole 31 may be formed to have shapes similar to each other.

In addition, a reinforcement portion 22 in which the charging housing 20 and the side outer 30 overlap with each other is formed around the mounting hole 21 of the panel coupling bodies 10, 20, 30. That is, as illustrated in FIG. 4, the reinforcement portion 22 is formed by facing two parts while the charging housing 20 and the side outer 30 overlap with each other, thereby forming the reinforcement portion 22 with reinforced rigidity.

Meanwhile, the cover main body 40 is a means for forming a charging port while being coupled to the panel coupling bodies 10, 20, 30, and formed with a plurality of hooks 41 spaced apart from each other along the edge of the cover main body 40.

Accordingly, if the cover main body 40 is coupled to the panel coupling bodies 10, 20, 30, the plurality of hooks 41 are in close contact with the reinforcement portion 22 to couple the cover main body 40 with the panel coupling bodies 10, 20, 30.

At this time, the hook 41 is formed in the form of a clip-type hook which provides an elastic force outward from the center of the mounting hole 21 formed in the panel coupling bodies 10, 20, 30, thereby securing a fixed force at which the cover main body 40 is fixed to the panel coupling bodies 10, 20, 30.

Meanwhile, the hook 41 formed on the cover main body 40 may secure the rigidity of the coupling portion as it is in close contact with the reinforcement portion 22 of the panel coupling bodies 10, 20, 30, thereby preventing the panel coupling bodies 10, 20, 30 from being deformed or damaged by the hook 41.

In addition, as illustrated in FIG. 5, when the charging housing 20 and the side outer 30 are welded to form the panel coupling bodies 10, 20, 30, it is preferable that the spot welding is mainly performed at the portion at which the reinforcement portion 22 is formed so that a welding point W is formed in the reinforcement portion 22.

Meanwhile, a skin 50 which covers the surface of the cover main body 40 is further provided. Accordingly, by exposing the skin 50 to the outside, it is possible to beautifully maintain the appearance of the cover module as illustrated in FIG. 1.

At this time, as illustrated in FIG. 5, it is preferable that an adhesive 60 is applied to an interface between the skin 50 and the panel coupling bodies 10, 20, 30 so as not to spoil the beauty of the appearance of the skin 50, and the skin 50 is bonded to the panel coupling bodies 10, 20, 30 by the adhesive 60.

A step of configuring the cover module of the charging port for an electric vehicle described above will be described.

First, the panel coupling bodies 10, 20, 30 are prepared by coupling the inner panel 10, the charging housing 20, and the side outer 30.

In order to configure the panel coupling bodies 10, 20, 30, the inner panel 10 and the charging housing 20 are first fixed as illustrated in FIG. 3A. Then, the mounting hole 21 is formed by coupling the inner panel 10 with the charging housing 20.

Then, as illustrated in FIG. 3B, the side outer 30 in which the through hole 31 corresponding to the mounting hole 21 is formed is prepared.

Then, the inner panel 10 and the side outer 30 coupled to the charging housing 20 are coupled to each other by aligning the through hole 31 with the mounting hole 21 so that the mounting hole 21 is maintained.

At this time, the inner panel 10, the charging housing 20, and the side outer 30 are preferably fixed to each other by spot welding.

Meanwhile, the cover main body 40 on which the hook 41 is formed at the edge thereof is prepared.

Then, the cover main body 40 is press-fitted into the mounting hole 21 of the panel coupling bodies 10, 20, 30 so that the hook 41 is in close contact with the periphery of the mounting hole 21 of the panel coupling bodies 10, 20, 30, that is, the reinforcement portion 22, so that the cover main body 40 is coupled to the panel coupling bodies 10, 20, 30.

Accordingly, when the cover main body 40 is coupled to the panel coupling bodies 10, 20, 30, the cover main body 40 is covered with the skin 50 using the adhesive 60.

Although the present disclosure has been described with reference to the accompanying drawings and the aforementioned preferred exemplary embodiments, the present disclosure is not limited thereto and limited by the claims to be described later. Accordingly, those skilled in the art may variously modify and change the present disclosure without departing from the technical spirit of the claims to be described later.

What is claimed is:

1. A cover module of a charging port for an electric vehicle, the cover module comprising:
   a panel coupling body comprising a charging housing fixed to an inner panel of a vehicle body of the electric vehicle to form a mounting hole, and a side outer coupled to face the inner panel fixed to the charging housing so that the mounting hole formed by the charging housing and the inner panel is maintained; and
   a cover main body formed in a shape corresponding to the mounting hole, provided with a plurality of hooks along an edge thereof to cover the mounting hole, and coupled to the panel coupling body by the hooks.

2. The cover module according to claim 1, wherein a peripheral portion of the mounting hole of the panel coupling body is formed with a reinforcement portion in which the charging housing and the side outer overlap with each other.

3. The cover module according to claim 2, wherein the cover main body is fixed to the panel coupling body while the plurality of hooks are in close contact with the reinforcement portion.

4. The cover module according to claim 3, wherein the hooks provide an elastic force outward from a center of the mounting hole formed in the panel coupling body.

5. The cover module according to claim 2, wherein the reinforcement portion is formed with a welding point at which the charging housing and the side outer are spot-welded.

6. The cover module according to claim 1, further comprising a skin covering a surface of the cover main body.

7. The cover module according to claim 6, wherein the skin is bonded to the panel coupling body by an adhesive.

8. The cover module of the charging port according to claim 1, wherein the inner panel is any one of a quarter inner panel, a filler inner panel, and an extension extending therefrom of the vehicle body of the electric vehicle.

9. An electric vehicle comprising:
   a vehicle body;
   a charging port;
   a panel coupling body comprising a charging housing fixed to an inner panel of the vehicle body to form a mounting hole, and a side outer coupled to face the inner panel fixed to the charging housing so that the mounting hole formed by the charging housing and the inner panel is maintained;
   a cover main body formed in a shape corresponding to the mounting hole; and
   a plurality of hooks provided along an edge of the cover main body to cover the mounting hole, wherein the cover main body is coupled to the panel coupling body by the plurality of hooks.

10. The electric vehicle according to claim 9, wherein a peripheral portion of the mounting hole of the panel coupling body is formed with a reinforcement portion in which the charging housing and the side outer overlap with each other.

11. The electric vehicle according to claim 10, wherein the cover main body is fixed to the panel coupling body while the plurality of hooks are in close contact with the reinforcement portion.

12. The electric vehicle according to claim 11, wherein the hooks provide an elastic force outward from a center of the mounting hole formed in the panel coupling body.

13. The electric vehicle according to claim 10, wherein the reinforcement portion is formed with a welding point at which the charging housing and the side outer are spot-welded.

14. The electric vehicle according to claim 13, further comprising a skin covering a surface of the cover main body.

15. The electric vehicle according to claim 14, wherein the skin is bonded to the panel coupling body by an adhesive.

16. The electric vehicle according to claim 9, wherein the inner panel is any one of a quarter inner panel, a filler inner panel, and an extension extending therefrom of the vehicle body.

17. A method for configuring a cover module of a charging port for an electric vehicle, the method comprising:
   coupling an inner panel and a charging housing, the coupling forming a mounting hole;
   coupling a side outer comprising a through hole to the inner panel by aligning the through hole with the mounting hole;
   fixing the inner panel, the charging housing, and the side outer to each other by welding;
   press-fitting a cover main body into the mounting hole, wherein the cover main body comprises a hook along an edge of the cover main body and in close contact with a peripheral portion of the mounting hole; and
   covering the cover main body with a skin using an adhesive.

* * * * *